United States Patent
Boltz et al.

(10) Patent No.: US 8,127,279 B2
(45) Date of Patent: Feb. 28, 2012

(54) SYSTEMS AND METHODS FOR GRAPHICAL INDEXER OPERATION ON DOCUMENTS WITH SOSI CHARACTERS

(75) Inventors: Benjamin A. Boltz, Westminster, CO (US); Kenneth P. Nolan, Buena Vista, CO (US); Debra K. Wagner, Louisville, KY (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1155 days.

(21) Appl. No.: 11/469,536

(22) Filed: Sep. 1, 2006

(65) Prior Publication Data

US 2008/0126382 A1    May 29, 2008

(51) Int. Cl.
*G06F 9/45* (2006.01)
(52) U.S. Cl. ......... 717/136; 715/200; 715/208; 715/256
(58) Field of Classification Search .................. 717/136
See application file for complete search history.

(56) References Cited

U.S. PATENT DOCUMENTS

| | | |
|---|---|---|
| 4,761,761 A | 8/1988 | Sekiguchi |
| 5,005,137 A | 4/1991 | Ernst |
| 5,524,191 A | 6/1996 | Storisteanu et al. |
| 6,055,365 A | 4/2000 | Tye |
| 6,400,287 B1 | 6/2002 | Ehrman |
| 2002/0046294 A1 | 4/2002 | Brodsky et al. |
| 2002/0154042 A1 | 10/2002 | Igarashi et al. |
| 2005/0097434 A1 | 5/2005 | Storisteanu |

OTHER PUBLICATIONS

"Validation of Double-Byte Character Sets Text for Prompting in a Language-Sensitive Editing System" IBM Techincal Disclosure, vol. 37, Issue 11. pp. 11-14 Nov. 1, 1994.*

* cited by examiner

*Primary Examiner* — Anna Deng
*Assistant Examiner* — Matthew Brophy
(74) *Attorney, Agent, or Firm* — Duft Bornsen & Fishman, LLP

(57) ABSTRACT

Systems and methods associated with indexing of information in documents where the documents include line data with shift out/shift in ("SOSI") code point encodings. SOSI controls are often embedded in documents encoded as simple line data (data formed to be printed on line printers). A document indexing system in accordance with features and aspects hereof converts the SOSI characters embedded in such a document to reserved codes for presentation on a user interface. The user may then precisely select trigger and field parameters used for identifying index values in such a line data document for purposes of indexing and archiving. The reserved controls help a user identify trigger and field value in a manner that the indexing system can track to determine whether and where the selected trigger and field values contain SOSI characters and thus require different column counting and indexing.

17 Claims, 6 Drawing Sheets

SYSTEMS AND METHODS FOR GRAPHICAL INDEXER OPERATION ON DOCUMENTS WITH SOSI CHARACTERS

BACKGROUND

1. Field of the Invention

The invention relates to the field of document management and more specifically relates to systems and methods to improve operation of a document indexing user interface to index documents that contain shift out and shift in ("SOSI") embedded control codes such as for double-byte code page encodings.

2. Statement of the Problem

Document management systems provide a flexible, configurable, centralized management structure for controlling access to documents of an enterprise and for managing revisions to documents. In general, document management systems provide security mechanisms to allow an administrator to clearly define allowed and disallowed access to particular documents in accordance with a wide variety of access parameters such as user ID, group associations for a particular user ID, physical or logical location of a particular user, etc. In general, such a document management system includes a database used for indexing the content of all documents submitted to the document management system. The content oriented database is a repository for indexing all documents in the document management system based on textual content of the document as well as other attributes of the document (such as name, author, etc.). An example of a common, commercially available document management system is IBM's DB2 Content Manager OnDemand for Multi-Platforms. Information regarding this exemplary document management system is readily available to those of ordinary skill in the art, for example, www.ibm.com.

To index the document in the document management system database requires identifying index values from the textual information contained in each document submitted to the document management system. Where a document is structured in accordance with high level structured document standards, the defined structures of the standards often rigorously define beginning and end of textual fields as well as various attributes and parameters of such identified textual fields. Locating fields of information to be indexed in the case of such structured document standards is a simpler, well defined process readily understood by those of ordinary skill in the art. Examples of such structured document standards are IBM's Advanced Function Presentation ("AFP") architecture and Adobe's Portable Document Format ("PDF"). These and other well-known, commercially available structured document formats permit the document indexing system to readily and rigorously identify fields of textual information useful for index values in the document management, database structures.

However, a large class of documents may simply contain line data. As used herein, "line data" refers to data formatted so that it can be printed on a line printer. Line printers are typically older, legacy printing systems that were adapted only for receipt of simple encoded characters and simple formatting controls such as "new line", "index line feed", "top of page", etc. Often the text and controls are encoded according to the EBCDIC or ASCII standards defining certain 8-bit values as printable characters and other 8-bit values as control codes. In addition to the simple formatting control codes, some line printers are capable of processing single byte character sequences ("SBCS") as well as double-byte character sequences ("DBCS"). Double-byte character sequences are common in languages with a substantial number of characters for encoding words and phrases. For example, Chinese and Japanese utilize character or phrase symbols numbering in the thousands. Thus, two bytes are required for encoding code points representing individual glyphs or symbols for Chinese and Japanese language line printers. Still other languages require three or more bytes for encoding various symbols native to the language.

In standard EBCDIC line data, a transition between SBCS and DBCS text encoding is indicated by a shift out control code ("SO"—encoded as a hexadecimal value of 0x0E). The transition from DBCS encoding back to SBCS encoding is marked by the shift in control code ("SI"—encoded as hexadecimal value 0x0F). When transmitted to a suitably adapted line printer, the SO and SI control codes are processed by the line printer to cause appropriate imaging of corresponding single or double-byte character values on the printable medium of the line printer.

When indexing standard structured documents such as an AFP or PDF structured document, the structural elements defined by the standards help the indexing program identify the start of a document, start of a page, a particular field in the document etc. By contrast, indexing an EBCDIC line data document containing only line data is a more complicated task for the indexing system. Typically, the document indexing system must define a "trigger" parameter for indexing. The trigger parameter is defined by a string (i.e., a group of bytes) that can be found only at a specified location of the line data document. Any "field" to be indexed in such a document may then be defined by a byte or column offset from a corresponding trigger. Thus, the triggers serve as anchor point definitions for subsequent definition of an index field location within similar line data documents to be indexed. For example, in a line data document containing customer invoices, a useful indexing parameter may identify a trigger string such as the vendors name known to be present at a fixed position in the invoice. A customer name or account number could then be defined as an index field identifying its location relative to the vendor name in the invoice line data.

It is useful in an indexing system to provide a graphical user interface for a user to simplify definition of triggers and index field locations within a line data document to be indexed (or a group of related documents to be indexed based on similar index field locations). Such a graphical user interface may be used, for example, to permit the user to select particular text to be defined as a "trigger" or to be defined as a "field" (e.g., defining the location of an index field as relative offset from the anchor position of a trigger found in the document).

A problem arises in effectively utilizing a graphical user interface to define triggers and field locations within a line data document that contains a mixture of SBCS and DBCS sequences. For such a GUI definition of parameters for indexing, the document is first presented on a display screen for the user to select strings of interest as indexing parameters. Typically as presently practiced a line data document is formatted for a display by converting it to an equivalent ASCII encoded string—a more common encoding for presentation on a display screen. This conversion process typically strips any shift out ("SO") or shift in ("SI") control codes since there is no equivalent code in ASCII for the EBCDIC SO and SI characters. Thus it is a problem in a GUT aspect of the document indexing system to select columns or strings of characters from a display of a line data document to accurately determine a location of an index field relative to a trigger string. The selected strings will not include the stripped SO or SI control codes that indicate shifts between single and double byte character sequence. Hence, the selected triggers and fields will not accurately reflect the proper byte position in the original EBCDIC line data document file to later locate the selected text when indexing the document. When the selected trigger and field definitions are later used to locate corresponding text in line data documents, the column/byte locations specified by the selected information on the GUI display may not match the location of those fields in a document being indexed.

It is evident from the above discussion that a need exists for an improved method and associated systems for permitting accurate selection of text to define triggers and index field locations for indexing of line data documents having double-byte character sequences therein.

SUMMARY

The invention solves the above and other related problems by providing methods, program products, and associated systems for improving document indexing in a documents management system for line data documents having a mixture of single byte character sequences and double-byte character sequences. Features and aspects hereof provide for converting embedded shift out ("SO") and shift in ("SI") control codes into corresponding first and second reserved code points. The reserved code points may then be converted into unique graphical elements on the display screen so that a user can see the location of the original SO and SI EBCDIC controls on a display when selecting text to define parameters for the document indexer.

In one aspect hereof, a method and corresponding program product is provided

The invention may include other exemplary embodiments described below.

DESCRIPTION OF THE DRAWINGS

The same reference number represents the same element on all drawings.

DETAILED DESCRIPTION OF THE DRAWINGS

FIGS. 1-3 and 5-9 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
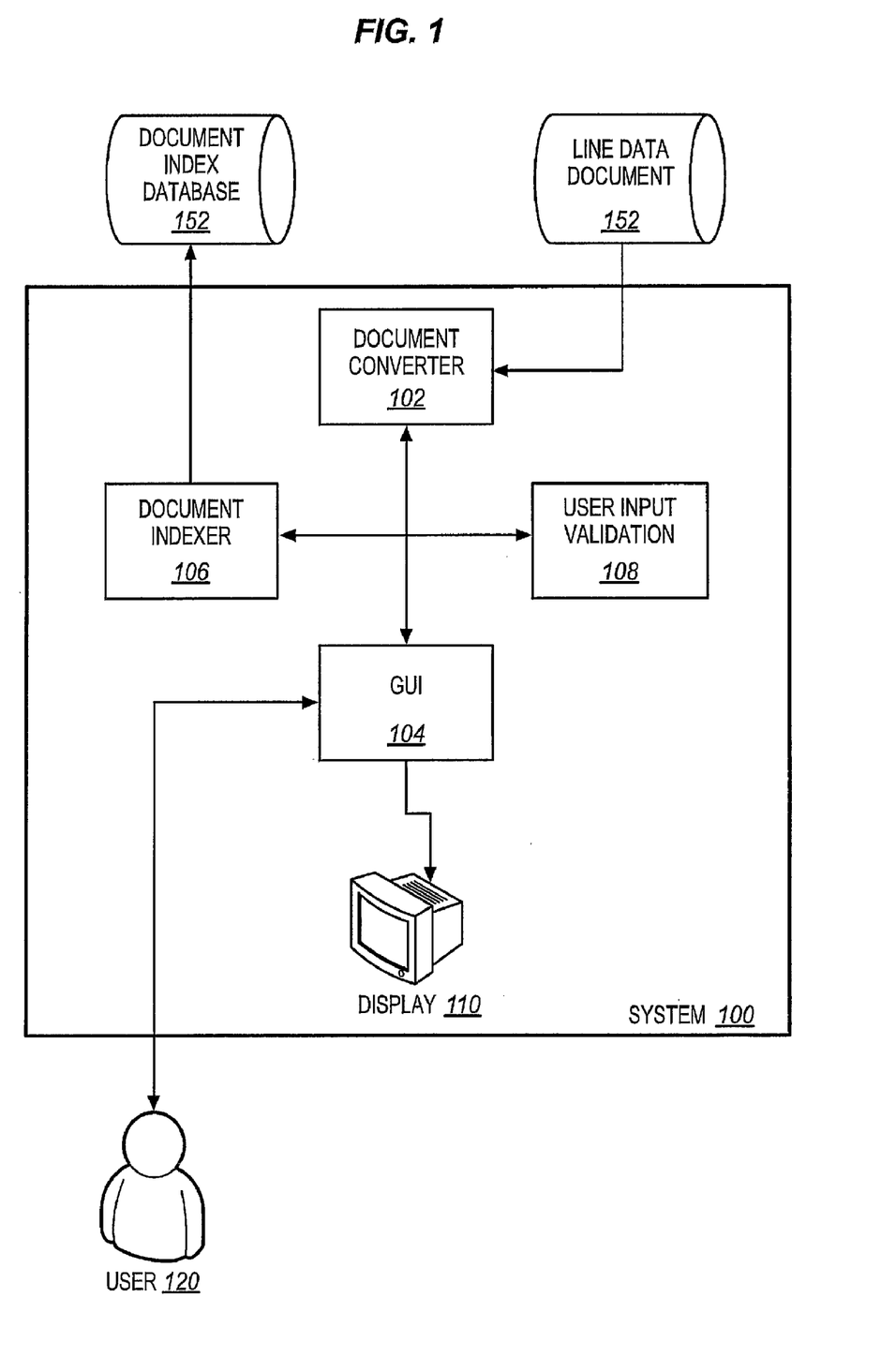
FIG. 1 is a block diagram of an exemplary document management system including document indexing in accordance with features and aspects hereof.

FIG. 1 is a block diagram of a system 100 for indexing line data documents 150 to generate corresponding entries in document index database 152. In general, such a document indexing system 100 is an aspect of a document management system that provides for archiving and access control to the contents of documents of an enterprise. The document index database 152 generally contains entries identifying the location of key or index field values found within a document. Thus, as an aspect of the broader document management system, a particular document may be found by referencing key field values in records of the document index database 152.

As noted above, prior document indexing techniques and systems encountered problems when a line data document contained a mix of single byte character sequences and double-byte character sequences. In accordance with features and aspects hereof, system 100 may include a document converter element 102 for converting SO and SI control codes prior to displaying a line data document 150 on display 110. In particular and as discussed further herein below, document converter 102 first converts each SO or SI control code within document 150 into a corresponding first and second reserved code point, respectively. Line data document 150 so converted by converter 102 is then displayed by GUI 104 on display 110 for viewing by user 120. The reserved code points serve as "placeholders" for corresponding SO and SI codes in the original line data document. The reserved code points may then be displayed as any useful graphical element such as an image, a glyph, a color-coded character, or any other graphical object or representation to suggest to the user the position of the corresponding SO and SI control codes in the original line data document.

User 120 through GUI 104 may then select particular strings to define triggers and index field locations for use by document indexed indexer 106 in its processing index line data document 150 into document index database 152. GUI 104 provides a suitable input devices (not shown) permitting user 120 to select particular strings presently displayed on the display 110. Exemplary of such input devices are keyboards, mouse, pen and other pointer devices, touch screens, voice input, etc. Such input devices and associated processing techniques are well known to those of ordinary skill in the art and omitted herein simply for brevity of this discussion. As noted above, document 150 as converted and displayed on display 110 permits a user 120 to properly select strings from display 110 through GUI 104 that will accurately map to corresponding byte locations in line data document 150. Thus, document indexer 106 may accurately locate defined index fields within the document when generating records for entry in document index database 152.

GUI 104 is also operable in conjunction with user input validation element 108 to help assure that the selected strings by user 120 through GUI 104 and display 110 correctly define triggers and index field locations for use by document indexer 106. As discussed further herein below, some restrictions may be applied to strings selected by user 120 in defining triggers and index field locations for use by document indexer 106. Such restrictions may be expressed as rules to assure that the selected string for a particular trigger or field to be defined will be useful for document indexer 106 in performing its designated function.

Those of ordinary skill in the art will readily recognize numerous additional elements that may be configured in a fully functional document management system 100. Such additional, well-known elements have been eliminated from FIG. 1 for simplicity and brevity of this discussion. Still further, those of ordinary skill in the art will readily recognize that the functions shown in system 100 of FIG. 1 may be functional elements within a single data processing system or may be functional elements distributed over a network of data processing systems utilizing well-known distributed processing techniques. Further, storage elements associated with storage and retrieval of line document line data document 150 and document index database 152 may be integrated within a single data processing system or network utilizing distributed processing and network storage techniques and architectures. All such design choices are well known to those of ordinary skill in the art. Thus, the exemplary system 100 of FIG. 1 is intended merely to suggest one possible functional decomposition of elements useful in accordance with features and aspects hereof to properly archive and index documents containing line data with both single and double-byte character sequences.

Figure 2:
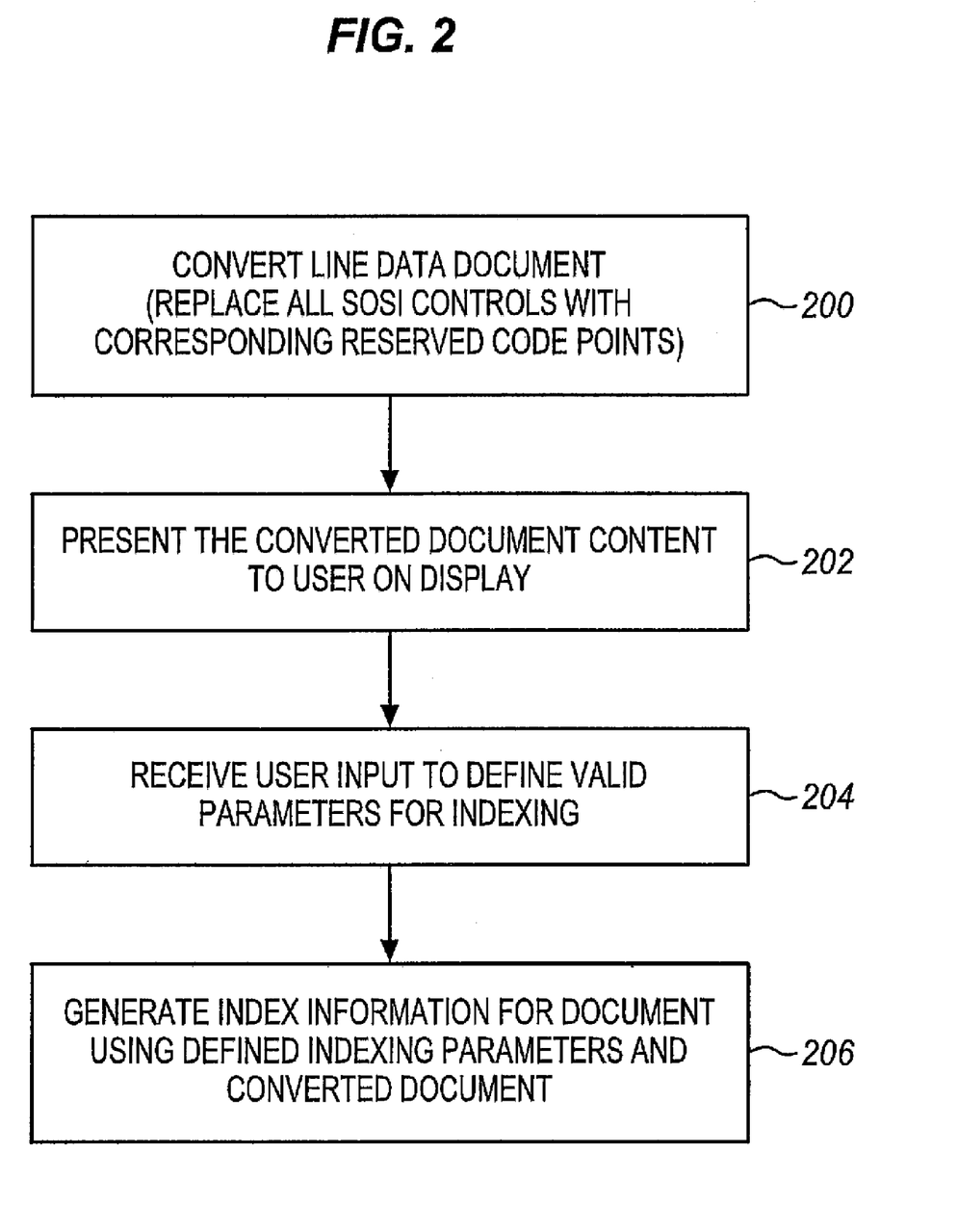
FIG. 2 is a flowchart describing an exemplary method for indexing of line data documents in accordance with features and aspects hereof.

FIG. 2 is a flowchart describing a method in accordance with features and aspects hereof for improving document indexing functions of a document management system. The improved document indexing provides accurate location information for line data comprising both single byte and double-byte EBCDIC character sequences. Such accurately defined triggers and index field locations may then be used by a document indexing program to accurately locate trigger and corresponding index values within a line data document for purposes of generating entries in a document indexing database of the document management system. Element 200 of FIG. 2 is first operable to convert a supplied line data document for use by the GUI and document indexing features and aspects hereof. In particular, all SO and SI control codes within the line data document are converted to corresponding first and second reserved code points, respectively. SO and SI EBCDIC control codes have no corresponding displayable font image or glyph defined in any standard code page or encoding scheme. Preferably, the selected first and second reserved code points are code points that are known not to appear in the line data document. In one preferred exemplary embodiment, code points corresponding to hexadecimal values 0x1E and 0x1F may be used as the reserved code point values. These reserved code points also may be devoid of any associated character image or glyph. In such a case, the GUI element will prepare and transmit a desired corresponding image or glyph or other graphic element to the display for purposes of showing the user the location of the corresponding SO and/or SI in the original line data file. Those of ordinary skill in the art will readily recognize that any code point values may be used as the reserved code point values if they are known not to be present in the line data document. For example, in particular applications, it may be known that there are no numeric characters in the line data document (due to particular knowledge of a particular unique application). Or, for example, it may be known that particular alphabetic characters never appear in the line data document generated by a particular application. Thus, in the broadest aspects hereof, any code point known to be unused in the line data document may be used by the conversion processing of element 200.

Element 202 is next operable to display the converted contents of the line data document on a user's display screen. The converted information replaces all SO and SI EBCDIC control codes with corresponding first and second reserved code points and thus the SO and SI control codes will be readily apparent to the user on the display screen. Element 202 therefore includes processing to display graphical element suggestive to the user of the location of a corresponding SO and/or SI control code in the original line data document.

Element 204 is next operable to receive user and validate input defining parameters for the subsequent indexing of the line data document. As discussed above, such parameters may preferably include the location of index value fields defined relative to a defined trigger string location. User input therefore defines one or more trigger strings within the displayed, converted line data document contents as well as one or more index field locations within the displayed, converted line data document contents. The user may define strings for the trigger and index field location values using any standard user input device including, for example, a keyboard, mouse, pen or other pointer device, touch screen, voice input, etc. Using such an input device, the user selects a string of characters intended to define a trigger value or intended to define an index field location. Element 204 may also assure that the selected strings are valid for their intended purpose as defining parameters of the subsequent indexing. Details of such validation are discussed further herein below.

Element 206 is then operable to complete the indexing process by generating index information using the defined, valid indexing parameters (e.g., defined trigger strings and defined index field location values). The document indexing process then scans the entire converted content of the line data document to identify one or more trigger strings within the document content and to generate an indexing database entry for the corresponding one or more fields located relative to a corresponding trigger location.

As noted above, since the converted line data document text is presented to the user on the display to permit selection of parameter strings, the document indexer may proceed with correct location offset information thus generating correct index entries in the document index database. A user may select any string to define a trigger parameter or to define an index field position. However, if a string contains a double-byte character sequence but does not include the corresponding SO or SI control codes (as converted and displayed by the GUI), it may be difficult when converting back to a string stored in the indexing database and used for future comparisons with line data documents.

In selecting indexing parameters (e.g., trigger strings and index field positions) any string may be selected however to avoid some of the complexities noted above, the best known mode of practicing the features and aspects hereof applies heuristic rules to determine that the user's selected string is a useful string for defining a trigger or index field position. Thus element 204 as discussed above attempts to validate the user's selection before using the selection as a parameter in document indexing.

Figure 3:
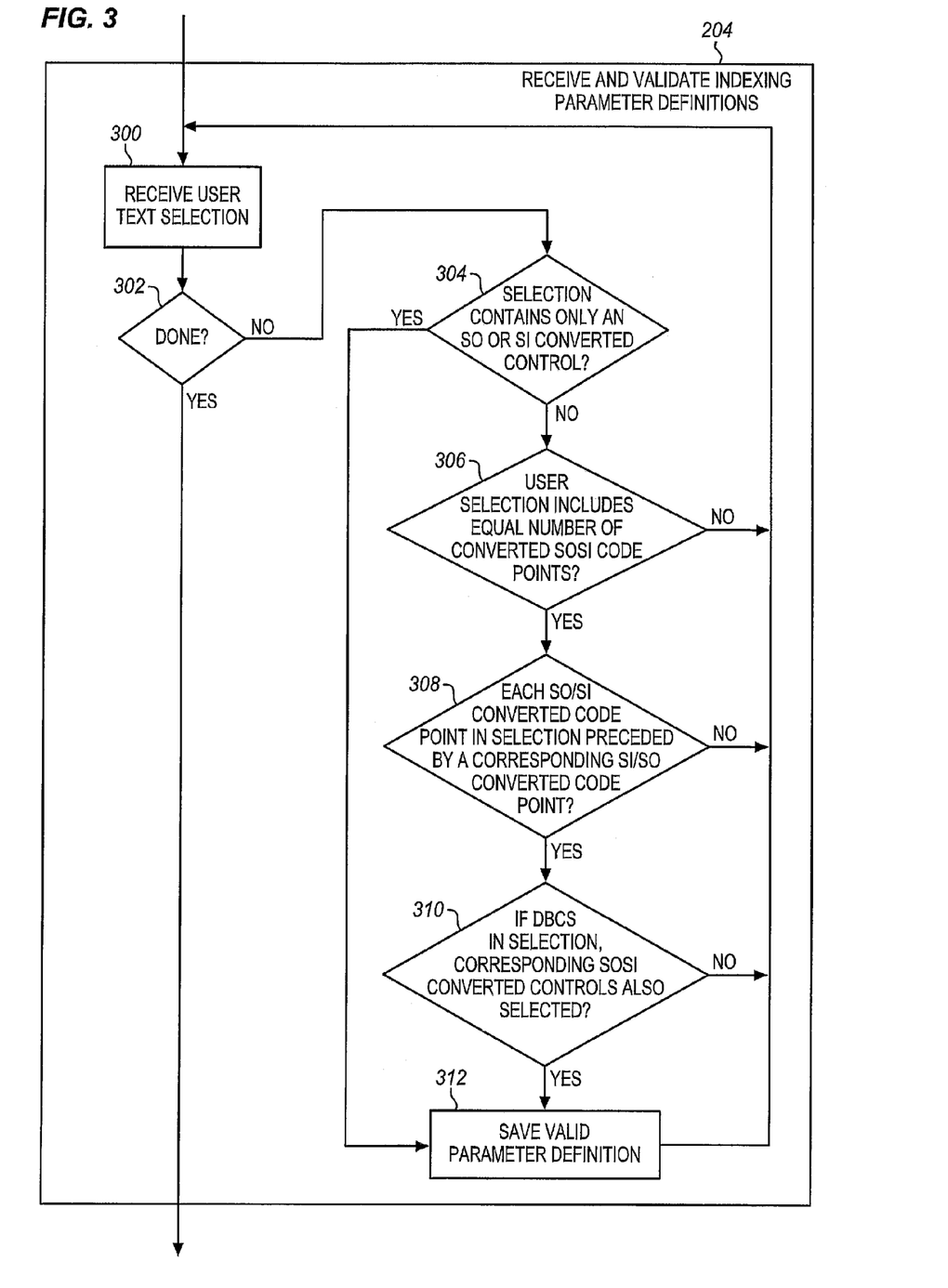
FIG. 3 is a flowchart providing additional exemplary details of a method in accordance with features and aspects hereof to validate user selections for indexing parameters.

FIG. 3 is a flowchart providing additional exemplary details of the validation processing of element 204 of FIG. 2. As noted above, element 204 of FIG. 2 is generally operable to apply heuristic rules to help identify whether the user's string selections are valid selections to define indexing parameters (e.g., for defining a trigger string and/or for defining an index field location relative to a trigger).

Element 300 is first operable to receive the next user input providing selection of a possible indexing parameter (e.g., a trigger string and/or an index field location selected by an exemplary string). If element 302 indicates that the user has completed selection of all indexing parameters, processing of element 204 is completed. Otherwise, the input representing the next parameter selection received by operation of element 300 is evaluated by elements 304 through 310 to determine its validity by applying a variety of heuristic rules.

Element 304 applies a first heuristic rule that identifies a simple selection by user input selecting only a single SO or SI control code (as converted for display). If the user has selected such a single control code, processing continues at element 312 to save this valid parameter definition and then loop back to element 300 to continue processing further user input until the user indicates indexing parameter definitions have been completed.

If element 304 indicates that the user selection is more than a single SO or SI control code (as converted for display), elements 306 through 310 next verify that, if the selected string includes any double-byte character sequences, an appropriate matched pair of SO and SI control codes (as converted for display) have been selected with the selected string characters.

Element 306 first verifies that the new user selection includes an equal number of SO and SI control codes (as converted to corresponding reserved code points). If not, the selection deemed invalid and not allowed by operation of element 204. Processing continues by ignoring the selection and returning to element 300 to continue awaiting further user input selection of other indexing parameters.

If element 306 indicates that an equal number of SO and SI control codes have been selected in the newly selected string, element 308 is then operable to assure that each SI control code (as converted to a reserved code point) in the user's selection is preceded by a corresponding SO control code (as converted to an appropriate corresponding reserved code point). Specifically, the first control code encountered in the user's selection must be an SO control code rather than an SI control code (each as converted to a corresponding first or second reserved code point). If not, a mismatched pair of SO and SI control codes may have been selected. In other words, an ending SI from an earlier string cannot be properly selected with a beginning SO control from a later string. In the case of such an invalid selection, the selection is ignored for purposes of defining indexing parameters and processing continues at element 300 to await further user input.

If element 308 indicates that no inappropriate pairs of SO and SI control codes have been selected in the newly selected string, element 310 is then operable to assure that if any double-byte character sequences are included in the selected text, that for each DBCS string both the corresponding SO control at the start of the DBCS string and the SI that terminates the DBCS string are included in the selection. In other words, if any portion of a DBCS string is to be selected, the entire DBCS string and its corresponding SO and SI control codes must be selected. If element 310 determines that the selection is invalid based on this rule, the selection is ignored and processing continues at element 300 awaiting further user input.

If the selection passes all heuristic rules applied, element 312 is operable as noted above to save the valid parameter definition selection for use by the document indexing process and processing continues looping back to element 300 to await further user input.

Those of ordinary skill in the art will readily recognize a variety of additional steps operable in a fully functional document management system and in particular a document indexing system associated with such a document management system. Thus the exemplary methods described by FIGS. 2 and 3 are intended merely as representative of exemplary embodiments of key features and aspects hereof to improve document indexing of line data documents in conjunction with a document management system.

Figure 4A:
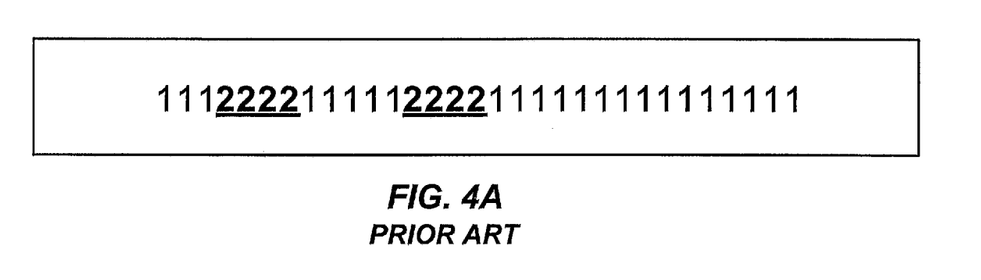
FIGS. 4A and 4B depict problems associated with present techniques and systems for indexing line data documents.
Figure 4B:
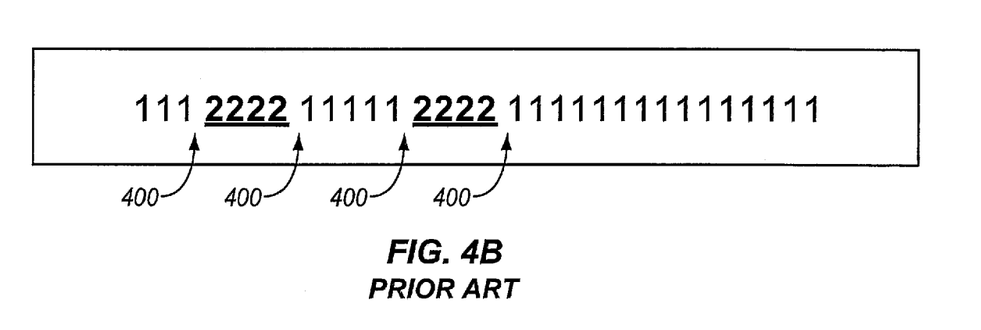

FIGS. 4A and 4B are block diagrams graphically depicting the nature of the problem in selecting indexing parameters from line data documents including both single byte character sequences and double-byte character sequences. As noted above, in accordance with present practice, SO and SI control codes embedded within line data document contents are typically stripped for purposes of displaying the information on a display using a corresponding code page for display presentation. FIG. 4A exemplifies such behavior. FIG. 4A represents a graphical user interface in which SBCS and DBCS characters are interspersed in the display. The exemplary characters displayed as "1" represent any SBCS character presented on the display from the line data document. Exemplary characters displayed as "2" (bolded and underlined to enhance the presentation for purposes of this discussion) represent any DBCS character presented on the display from the line data document. Those of ordinary skill in the art will clearly recognize that the character "1" and the character "2" are not particularly intended as any specific SBCS or DBCS code points but are rather intended to suggest all such SBCS code points and all such DBCS code points, respectively.

By way of example, the characters of FIGS. 4A and 4B may be represented as the original EBCDIC source encoding and shown translated to ASCII for display in FIGS. 4A and 4B. Those skilled in the art will recognize that the particular exemplary code points shown are not intended as accurate descriptions of any real SBCS or DBCS code points but rather are intended merely to suggest the conversion that takes place in current indexing techniques. The EBCDIC data in the original line data document for such exemplary data as in FIGS. 4A and 4B may appear for example as (hexadecimal data):

F1 F1 F1 0E 44 F2 44 F2 44 F2 44 F2 0F F1 F1 F1 F1 F1 0E 44 F2 44 F2 44 F2 44 F2 0F F1 F1 F1 . . . .

When displayed in accordance with present techniques of FIG. 4A, the SO and SI control codes may be stripped and thus the ASCII data as presented for user display and parameter selection would be (hexadecimal data):

31 31 31 82 F2 82 F2 82 F2 82 F2 31 31 31 31 31 82 F2 82 F2 82 F2 82 F2 31 31 31 . . . .

However, as can be seen, this approach generates inaccurate location offsets in that the SO and SI codes that will appear in the documents to be indexed are not counted when the indexing parameter is defined by the column/byte offsets in the above exemplary converted string. The SO and SI bytes are simply stripped and hence the byte count to locate a parameter string will be inaccurate.

As also noted above, another approach to help distinguish the start of a DBCS string and the end thereof is to modify the SO and SI characters into a simple space character to help separate the SBCS strings from an adjacent DBCS string and vice versa. FIG. 4B represents such a prior technique showing the same text fields but indicating an extra space 400 between each boundary of an SBCS and a DBCS string—in other words converting each SO and SI control code into a space character for purposes of display. As noted above, such presentation of SO and SI control codes as a simple space character generates ambiguity because space characters may appear normally within the text of the line data document. Thus, a user would be confused as to whether a particular space represents an actual space character within the line data document or represents an SO or SI control code translated into a space.

Thus, as suggested in FIG. 4B, the SO and SI control codes may be converted to a space character and thus the ASCII data as converted for display in FIG. 4B could appear as (hexadecimal data):

31 31 31 20 82 F2 82 F2 82 F2 82 F2 20 31 31 31 31 20
82 F2 82 F2 82 F2 82 F2 20 31 31 31 ....

However as noted earlier, this second technique causes problems when the space character appears in the line data document.

Figure 5:
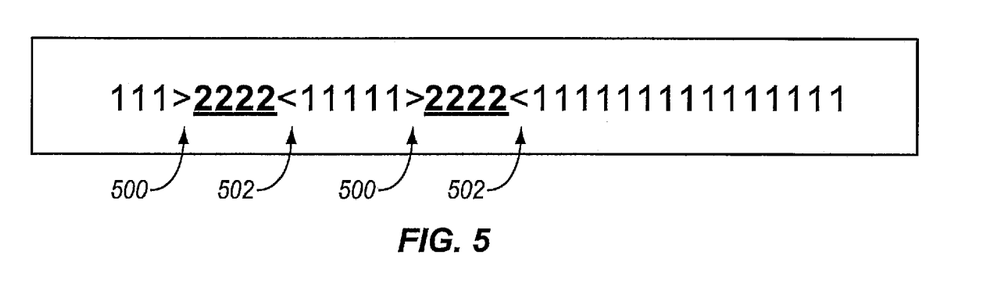
FIGS. 5 through 8 are diagrams of exemplary user displays permitting a user to select valid strings for indexing parameters and for disallowing selection of invalid strings for indexing parameters.

FIG. 5 represents an exemplary graphical display in which SO and SI control codes within a line data document have been translated to corresponding first and second reserved code points 500 and 502, respectively. As noted above, first reserved code 500 is a reserved code point that does not normally appear within the line data document contents and is represented for purposes of this discussion in FIG. 5 as a ">" glyph or image. Second reserved control code point 502 is represented as another reserved code point that does not normally appear within the line data document and is shown in FIG. 5 as a "<" glyph or image. As noted above, the particular graphic element used to represent the two reserved code points may be any visually useful image, glyph or other graphical object to suggest to the user visually the SO and SI locations in the underlying, original line data document. The DBCS character string "2222" is bracketed instances by an initial SO converted to reserved code point 500 and a trailing SI represented as reserved code point 502. Since the SO and SI control codes are clearly visible to a user on the present a display screen, the user may more easily select proper text strings to represent desired indexing parameters (e.g., trigger strings and strings representing index field locations relative to corresponding trigger strings).

Thus exemplary data as shown in FIG. 5 in accordance with features and aspects hereof may convert the exemplary EBCDIC line data into ASCII for display purposes as follows (hexadecimal data):

31 31 31 1E 82 F2 82 F2 82 F2 82 F2 1F 31 31 31 31 1E
82 F2 82 F2 82 F2 82 F2 1F 31 31 31 ....

Figure 6:
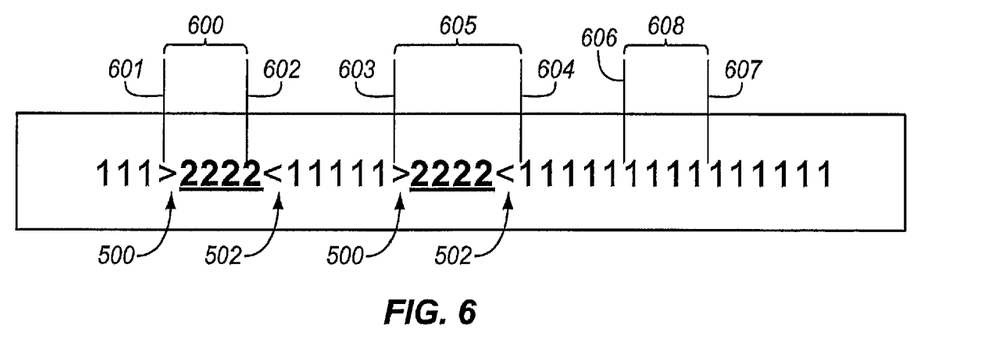
Figure 7:
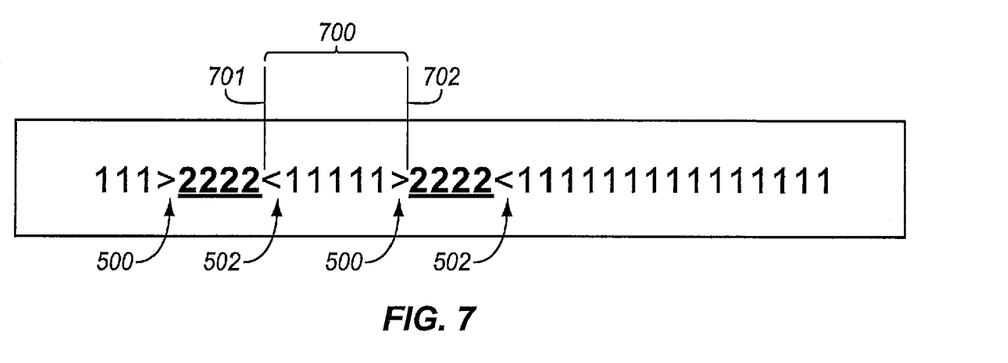
Figure 8:
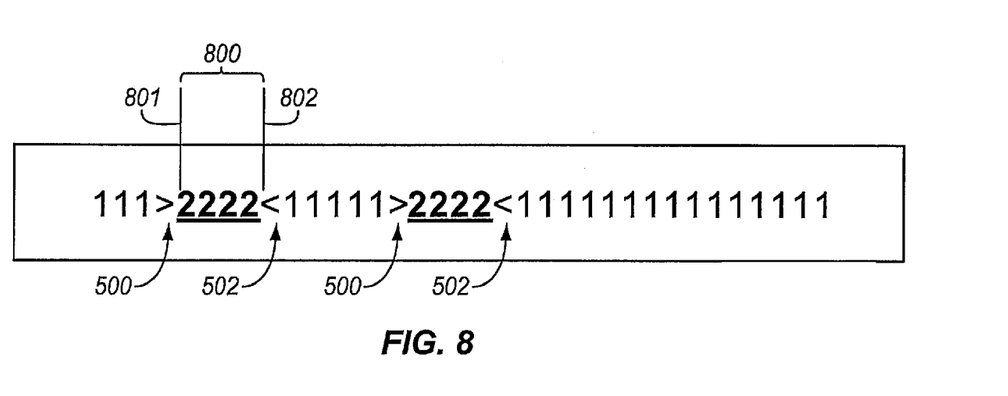

As noted above with respect to FIG. 3, in all exemplary preferred embodiment heuristic rules are applied to determine whether a particular text string selected by the user represents a valid string useful for the document indexing process. As noted above, a trigger string and/or an index field location string should preferably include appropriate pairings of displayed SO and SI control codes (translated into reserved code points and displayed as useful glyphs or images). FIGS. 6 through 8 are graphical representations of valid and invalid selections as discussed above with respect to the heuristic rules of FIG. 3. In FIGS. 6 through 8 the exemplary graphical display as in FIG. 5 is shown with the corresponding converted reserved code points 500 and 502 representing the SO and SI control codes bracketing DBCS text strings. A first and second vertical line in each figure represents user input selecting all the displayed code points between the two vertical lines. The particular user selections exemplified by these vertical lines in FIGS. 6 through 8 represent valid and invalid selections in accordance with a preferred embodiment of features and aspects hereof to permit valid strings to be defined and disallow invalid strings. As noted above, in the broadest aspects hereof, any string may be selected as an indexing parameter. However, in an exemplary preferred embodiment, heuristic rules may simplify the definition of indexing parameters to thereby simplify conversion between the converted form of the line data document and its original form for purposes of comparing parameter definitions with actual document text.

FIG. 6 represents graphically a first heuristic rule as discussed above wherein if an SO control code (displayed as a useful image or glyph representing the first reserved code point 500) is selected as part of a user selected string then the corresponding SI control code (represented as reserved code point 502 by a useful glyph or image) must also be selected. As shown in FIG. 6 vertical line 601 indicates the beginning of a user selection 600 while vertical line 602 represents the end of the user selection 600. Thus the user selection 600 includes a starting SO control code (code point 500) but does not include the corresponding matched SI control code. Thus there is all unequal number of SO and SI control codes in the user selection 600. This user selection is invalid and thus disallowed by operation of the method of FIG. 3 above.

By way of contrast, selection 605 represented by vertical line 603 and vertical line 604 represent a valid user selection of a DBCS string within the displayed line data document. This valid selection includes the second instance of a DBCS string ("2222") within the depicted line data document (e.g., an equal number of SO and SI control codes). In like manner, user selection 608 represented by vertical lines 606 and 607 also represents a valid selection containing only SBCS characters with no SO or SI control codes embedded therein (e.g., an equal number of SO and SI control codes).

FIG. 7 graphically represents a second heuristic rule as discussed above wherein, although an equal number of SO and SI control codes are selected, but a mismatched pair is selected. In other words, the first code of the selected string is an SI control code representing the end of a first DBCS string followed by an SO control code representing the beginning of the next DBCS string. Vertical line 701 represents the start of such a user selection 700 and vertical line 702 represents the end of such an invalid selection 700. Thus, user selection 700 represented by FIG. 7 is deemed invalid and ignored by the processing of FIG. 3 above.

FIG. 8 graphically represents a third heuristic rule as discussed above wherein, although equal number of SO and SI control codes are selected (e.g., zero), the user selection 800 delimited by vertical lines 801 and 802 includes DBCS characters but does not include the corresponding SO and SI control codes. Thus the selection represented by a FIG. 8 is deemed invalid according to the heuristic rules and therefore ignored by processing of FIG. 3 discussed above.

Those of ordinary skill in the art will readily recognize a wide variety of other valid and invalid user selections that may be processed by the user input and validation process discussed above with respect to FIG. 3. Thus, the exemplary selections represented by FIGS. 6 through 8 are intended merely as exemplary to represent all such valid and invalid user selections.

Figure 9:
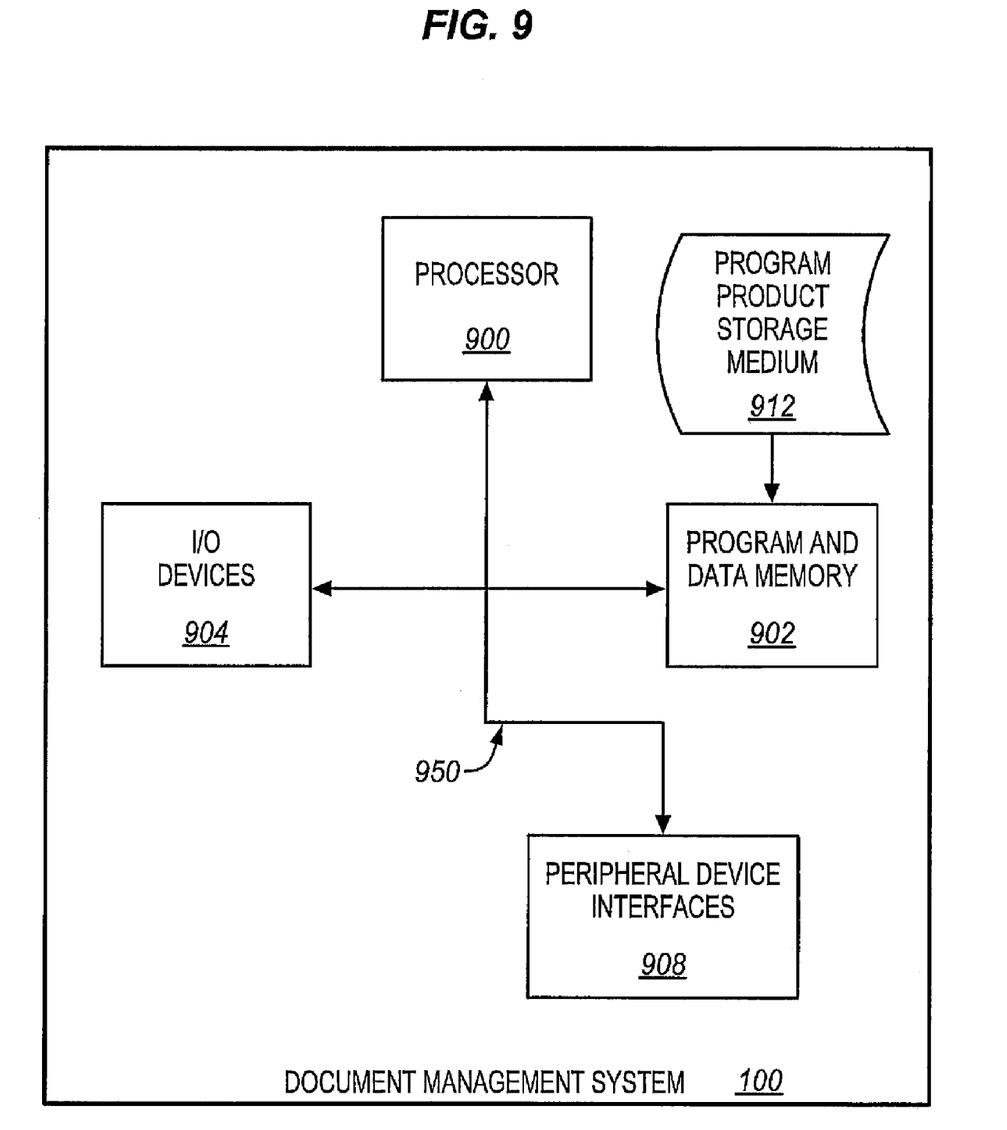
FIG. 9 is a block diagram of an exemplary data processing system that may provide document indexing and management features and aspects hereof including bulk storage of a program product that may embody methods and processes hereof.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 9 is a block diagram depicting a document management system 100 as a data processing device adapted to provide features and aspects hereof by executing programmed instructions and accessing data stored on a computer readable storage medium 912.

Furthermore, the invention can take the form of a computer program product accessible from a computer-usable or computer-readable medium 912 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 900 coupled directly or indirectly to memory elements 902 through a system bus 950. The memory elements can include local memory employed during actual execution of the program code, bulk storage, and cache memories which provide temporary storage of at least some program code in order to reduce the number of times code must be retrieved from bulk storage during execution.

Input/output or I/O devices 904 (including but not limited to keyboards, displays, pointing devices, etc.) can be coupled to the system either directly or through intervening I/O controllers. Network adapters or other peripheral interfaces 908 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A method of indexing documents encoded as line data stored on a non-transitory medium, the method comprising: receiving a document comprising hidden shift in controls and hidden shift out controls; determining a first reserved code point that can be graphically displayed and does not appear in the document, and a second reserved code point that can be graphically displayed and does not appear in the document; converting the document for indexing by: replacing the hidden shift out controls in the document with the first reserved code point that can be graphically displayed; and replacing the hidden shift in controls in the document with the second reserved code point that can be graphically displayed; displaying the converted document to a user including the first and the second reserved code points, wherein the first and the second reserved code points are displayed as graphical elements making locations of the hidden shift out controls and the hidden shift in controls visible; receiving user input defining parameters for indexing the document based on display of the converted document; and indexing the document in accordance with the defined parameters for indexing.

2. The method of claim 1 wherein the step of receiving user input further comprises: receiving user input defining a trigger and defining a field in the converted document.

3. The method of claim 2 further comprising: validating the definition of the trigger and the definition of the field.

4. The method of claim 3 further comprising: disallowing the user from defining an invalid trigger and/or an invalid field.

5. The method of claim 3 wherein the step of validating further comprises: verifying that the defined trigger and/or the defined field has an equal number of shift out controls and shift in controls represented by the first and the second reserved code points respectively.

6. The method of claim 3 wherein the step of validating further comprises: verifying that each shift in control in the defined trigger and/or the defined field is preceded by a corresponding shift out control, wherein the shift out control and the shift in control are represented by the first and the second reserved code point, respectively.

7. The method of claim 3 wherein the step of validating further comprises: verifying that defined triggers and/or fields containing double-byte code points also include corresponding pairs of shift out controls and shift in controls represented as the first and the second reserved code point respectively.

8. The method of claim 1 wherein: the first reserved code is a 0xIE code point; and the second reserved code point is a 0xIF code point.

9. A non-transitory system for indexing documents with line data stored on a tangible medium, the system comprising:
a document converter for receiving and converting a document comprising double-byte character codes and hidden shift out shift in ("SOSI") control codes to generate a converted document, the converter adapted to receive a document, determine a first reserved code point that can be graphically displayed and does not appear in the document, determine a second reserved code point that can be graphically displayed and does not appear in the document, replace the SOSI control codes in the document with the first and the second reserved code point, respectively, that can be graphically displayed in the converted document;
a display for displaying the converted document including the first and the second reserved code points wherein the first and the second reserved code points are displayed as graphical elements making the locations of the hidden shift out controls and the hidden shift in controls visible;
a graphical user interface for receiving user input associated with the displayed converted document, the user input including definition of a trigger and a field in the displayed converted document; and
a document indexer for adding index information about the document to a database based on the defined trigger and field.

10. The system of claim 9 further comprising: a user input validation element to validate the user input as properly defining a trigger and a field in the converted document.

11. The system of claim 9 wherein: the first reserved code is a 0xIE code point; and the second reserved code point is a 0xIF code point.

12. A non-transitory computer readable medium embodying programmed instructions which, when executed by a computer system, are operable to execute a method of indexing documents encoded as line data, the method comprising:
receiving a document comprising hidden shift in controls and hidden shift out controls;
determining a first reserved code point that can be graphically displayed and does not appear in the document, and a second reserved code point that can be graphically displayed and does not appear in the document;
converting the document to an indexed form by:
replacing the hidden shift out controls in the document with a first reserved code point that can be graphically displayed; and
replacing the hidden shift in controls in the document with a second reserved code point that can be graphically displayed;
displaying the converted document to a user including the first and second reserved code points, wherein the first and the second reserved code points are displayed as graphical elements making the locations of the hidden shift out controls and the hidden shift in controls visible;

receiving user input defining parameters for indexing the document based on display of the converted document; and indexing the document in accordance with the defined parameters for indexing.

13. The computer readable medium of claim 12 wherein the step of receiving user input further comprises: receiving user input defining a trigger and defining a field in the converted document.

14. The computer readable medium of claim 13 the method further comprising: validating the definition of the trigger and the definition of the field.

15. The computer readable medium of claim 14 the method further comprising: disallowing the user from defining an invalid trigger and/or an invalid field.

16. The computer readable medium of claim 14 wherein the step of validating further comprises: performing any of the steps of: verifying that the defined trigger and/or the defined field has an equal number of shift out controls and shift in controls represented by the first and the second reserved code points respectively; verifying that each shift in control in the defined trigger and/or the defined field is preceded by a corresponding shift out control wherein the shift out control and the shift in control are represented by the first and the second reserved code point, respectively; and verifying that defined triggers and/or fields containing double-byte code points also include corresponding pairs of shift out controls and shift in controls represented as the first and the second reserved code point respectively.

17. The computer readable medium of claim 16 wherein: the first reserved code is a 0xIE code point; and the second reserved code point is a 0xIF code point.

* * * * *

UNITED STATES PATENT AND TRADEMARK OFFICE
CERTIFICATE OF CORRECTION

| | | |
|---|---|---|
| PATENT NO. | : 8,127,279 B2 | Page 1 of 1 |
| APPLICATION NO. | : 11/469536 | |
| DATED | : February 28, 2012 | |
| INVENTOR(S) | : Boltz et al. | |

It is certified that error appears in the above-identified patent and that said Letters Patent is hereby corrected as shown below:

IN THE SPECIFICATIONS:

In column 2, line 61, the text "a GUT aspect" should read --a GUI aspect--

In column 3, line 6, the text "on the GUT" should read --on the GUI--

In column 9, line 35, the text "in all exemplary" should read --in an exemplary--

In column 10, line 7, the text "there is all unequal number" should read --there is an unequal number--

IN THE CLAIMS:

In column 12, claim 8, line 11, the text "0xIE" should read --0x1E--

In column 12, claim 8, line 12, the text "0xIF" should read --0x1F--

In column 12, claim 11, line 44, the text "0xIE" should read --0x1E--

In column 14, claim 17, line 14, the text "0xIE" should read --0x1E--

In column 14, claim 17, line 15, the text "0xIF" should read --0x1F--

Signed and Sealed this
Twenty-second Day of May, 2012

David J. Kappos
*Director of the United States Patent and Trademark Office*